United States Patent [19]

Little et al.

[11] 4,050,245

[45] Sept. 27, 1977

[54] CONCENTRIC DUAL ENGINE EXHAUST SYSTEM

[75] Inventors: Harold A. Little; Richard L. Balsley, both of Washington, Mich.

[73] Assignee: General Motors Corporation, Detroit, Mich.

[21] Appl. No.: 713,276

[22] Filed: Aug. 11, 1976

[51] Int. Cl.² .............................................. F01N 7/10
[52] U.S. Cl. .......................................... 60/313; 60/323
[58] Field of Search ................ 60/312, 313, 323, 282, 60/305; 285/133 R, 138

[56] References Cited

U.S. PATENT DOCUMENTS 1,294,475  2/1919  Kirkham .............................. 60/313

FOREIGN PATENT DOCUMENTS

| 218,184 | 7/1958 | Australia | 285/133 R |
|---|---|---|---|
| 634,616 | 1/1962 | Canada | 60/323 |
| 939,463 | 4/1948 | France | 60/313 |

*Primary Examiner* — Douglas Hart
*Attorney, Agent, or Firm* — Robert J. Outland

[57] ABSTRACT

A vehicle mounted internal combustion engine has a dual exhaust system including a single manifold having separate plenums connected to receive exhaust from diverse ones of the engine cylinders. The plenums have separate concentrically arranged discharge fittings which connect with a pair of exhaust pipes, mounted one inside the other, to provide two separate exhaust flow paths from the engine cylinders to the ends of the manifold connected exhaust pipes at their juncture with an associated exhaust converter.

6 Claims, 7 Drawing Figures

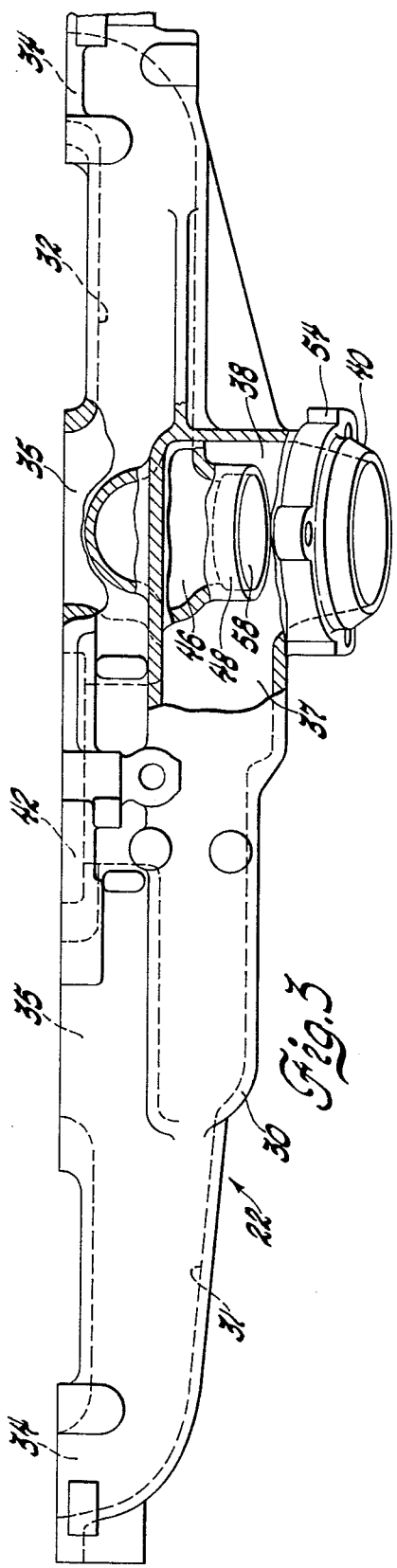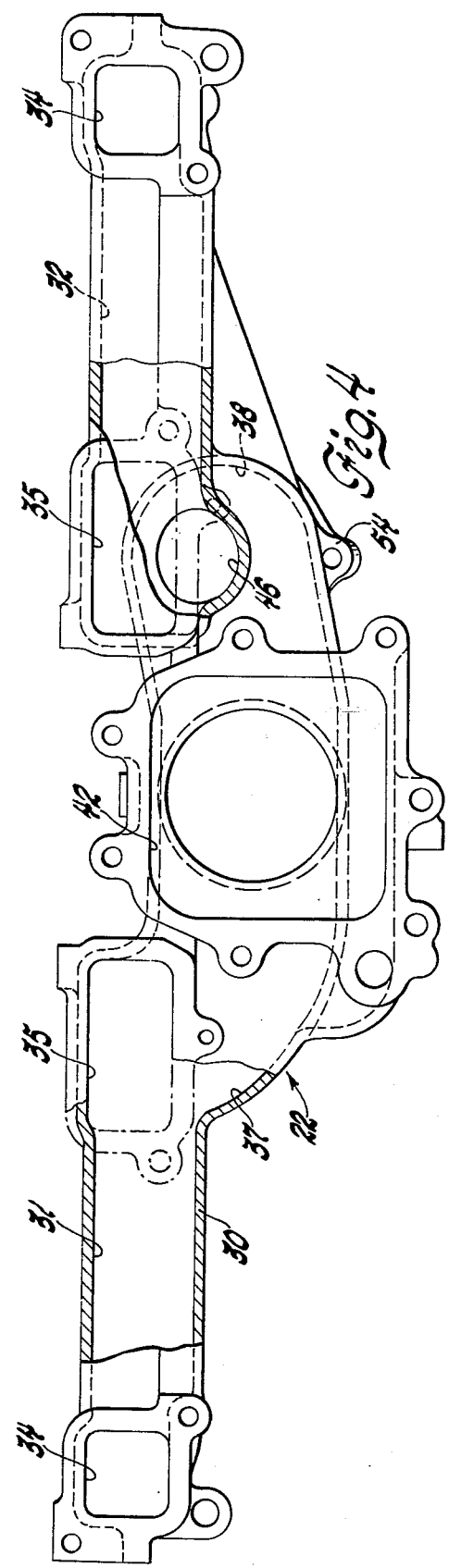

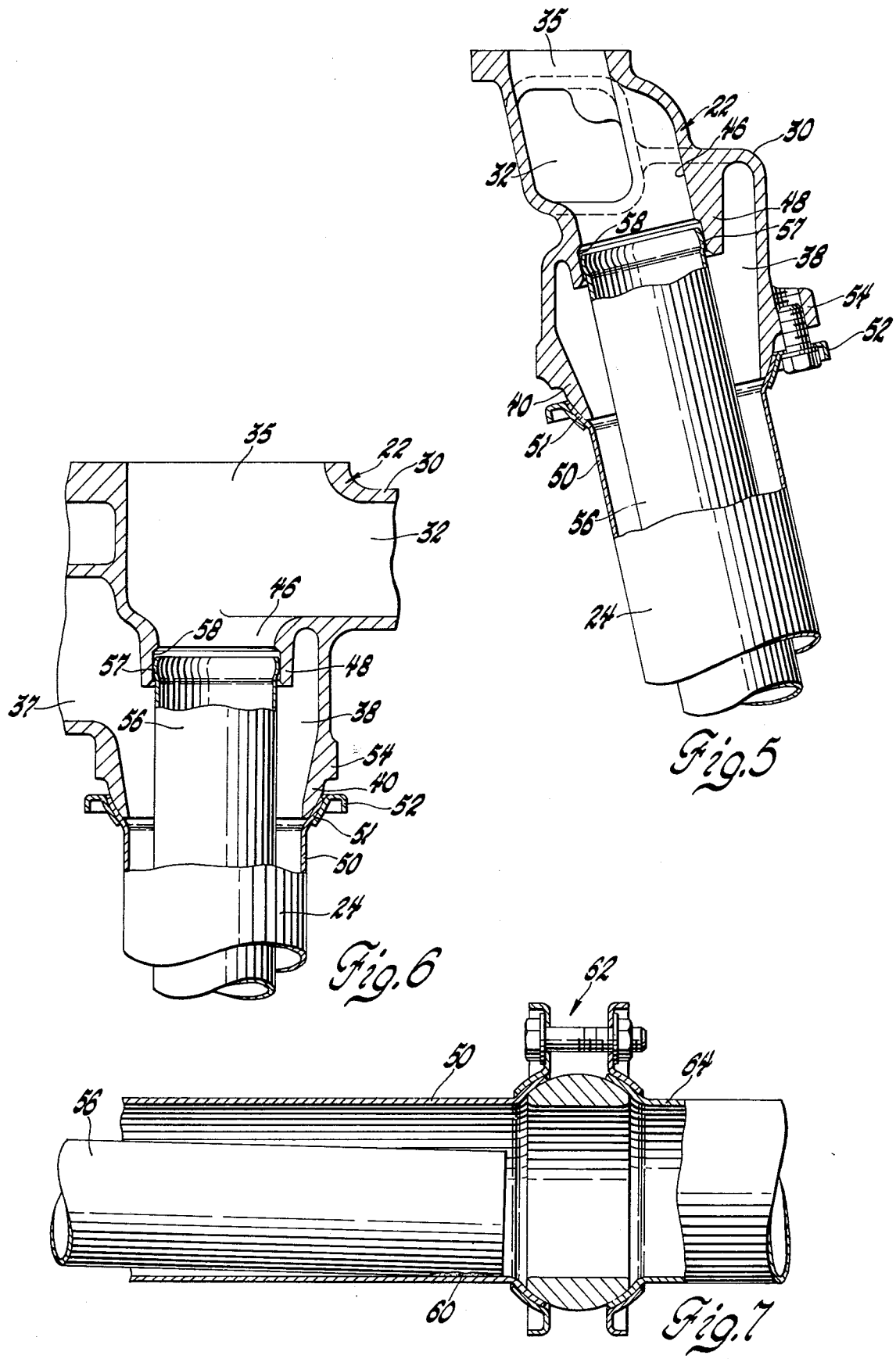

CONCENTRIC DUAL ENGINE EXHAUST SYSTEM

BACKGROUND OF THE INVENTION

This invention relates to exhaust systems for internal combustion engines and, more particularly, to a concentric dual exhaust system for a vehicle mounted internal combustion engine having a single manifold and concentric dual exhaust pipes.

It is known in the art relating to multi-cylinder internal combustion engines to provide in a single exhaust manifold, dual plenums for connection with diverse ones of the engine cylinders and having separate outlets for connection to separate exhaust pipes so as to provide separated dual exhaust passages over, at least, a portion of the length of the engine exhaust system. Such an arrangement is shown for example in U.S. Pat. No. 2,852,910 Wolfram, granted Sept. 23, 1958 to the assignee of the present invention. Such arrangements may be used, for example, to improve engine efficiency by reducing interference between exhaust pulses of adjacent cylinders or to provide reduced flow resistance in the exhaust system. More recently it has been recognized that such arrangements can be used to provide better defined pulsations in the exhaust system to aid the induction of secondary air to the engine exhaust passages through individual check valved inlet devices. Such a system may be used to eliminate the need for a separate air pump as provided in some commonly used secondary air injection (AIR) systems.

SUMMARY OF THE INVENTION

The present invention provides a dual exhaust system for a multi-cylinder internal combustion engine in a vehicle, in which separate exhaust passages are provided by a pair of exhaust pipes arranged one within the other and connected to separate concentrically arranged fittings of a single dual plenum exhaust manifold. The arrangement has the advantages of the prior known dual exhaust systems. Additionally, it provides a more compact structure for fitting within the spaces provided in a vehicle and one which allows both exhaust pipes to be connected in a single assembly step to their associated exhaust manifold and to a single exhaust catalytic converter without the need for special connecting fittings at the latter connection.

These and other features and advantages of the invention will be more fully understood from the following description of a preferred embodiment of the invention, taken together with accompanying drawings.

BRIEF DESCRIPTION OF THE DRAWINGS

In the drawings:

FIGS. 3 and 4 are respectively side and top views of the exhaust manifold used in the engine of FIGS. 1 and 2;

FIGS. 5 and 6 are respectively transverse and longitudinal cross-sectional views showing the connections of the dual exhaust pipes with the manifold of FIGS. 3 and 4; and FIG. 7 is a partial cross-sectional view showing the connection of the dual exhaust pipes with an associated exhaust converter.

DESCRIPTION OF THE PREFERRED EMBODIMENT

Figure 1:
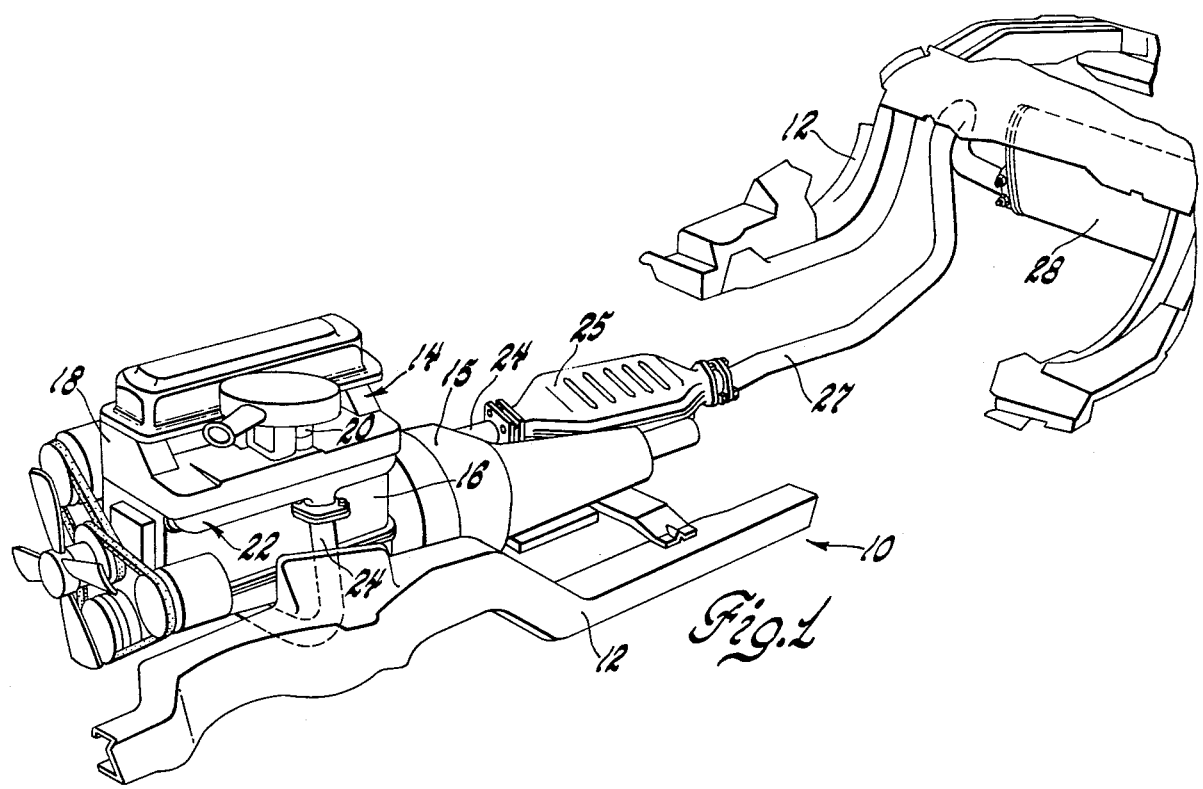
FIG. 1 is a fragmentary pictorial view showing certain portions of an automotive vehicle having an engine with an exhaust system formed accordng to the invention.

Referring now to the drawings in more detail, FIG. 1 shows portions of an automotive vehicle generally indicated by numeral 10. Vehicle 10 includes a supporting frame 12 of unitary construction, portions of which have been broken away in the drawing for clarity. An internal combustion engine 14 and associated transmission 15 are mounted on the frame in conventional fashion for powering the vehicle. The engine may be of any type in which two or more cylinders are connected with a common exhaust manifold, but the engine illustrated represents an in-line six cylinder engine of the general type shown in U.S. Pat. No. 3,949,715 Faix et al, granted April 13, 1976 to the assignee of the present invention.

Figure 2:
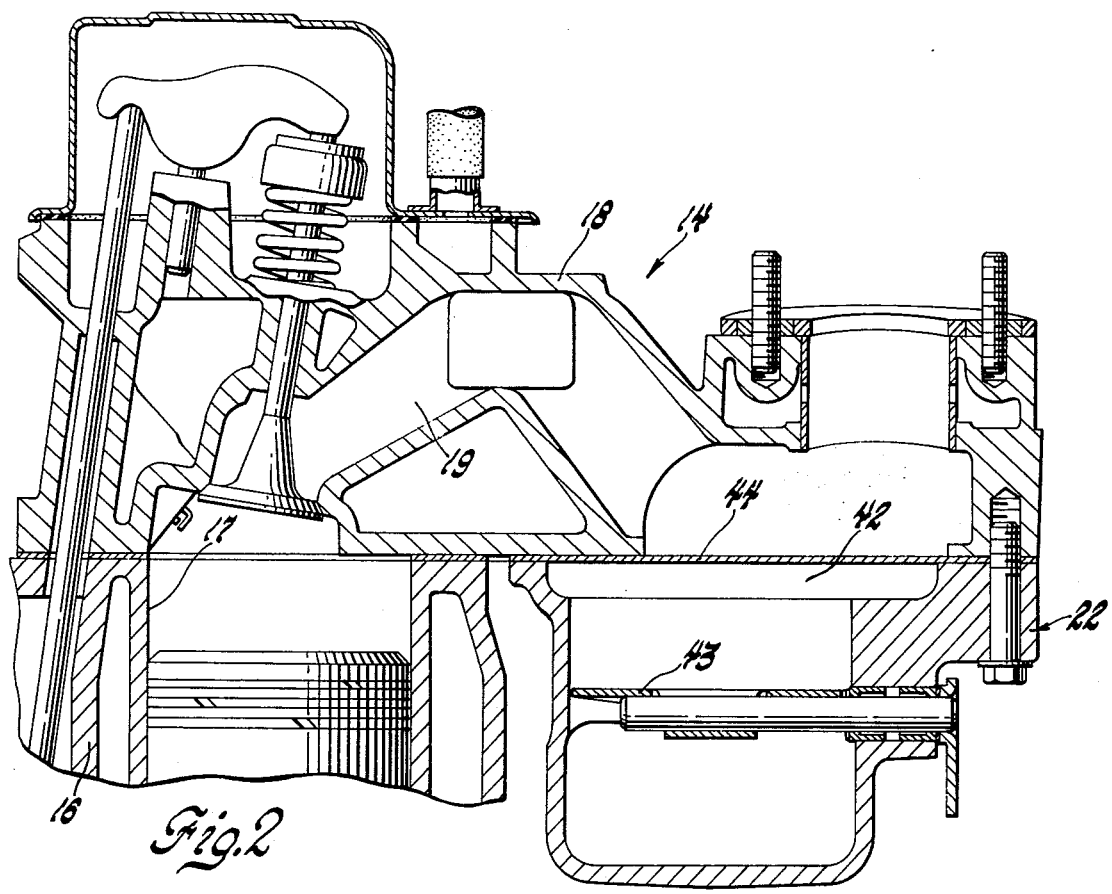
FIG. 2 is a fragmentary cross-sectional view of a portion of the engine in the vehicle of FIG. 1.

As best shown in FIG. 2, engine 14 includes a cylinder block 16, having a plurality of cylinders 17. An integral cylinder head and intake manifold 18 closes the ends of the cylinders and provides a plurality of intake passages 19 and exhaust passages, not shown, to provide for the supply and discharge of gases to and from the cylinders. A conventional carburetor 20 mounts on the manifold portion of the head to supply air-fuel mixture thereto.

The dual exhaust system of the present invention comprises a novel single exhaust manifold 22 mounted on the lower surface of the cylinder head-intake manifold member 18 and a dual exhaust pipe assembly 24 which connects the exhaust manifold 22 with a conventional catalytic exhaust converter 25. The converter 25 is, in turn, connected through a conventional single rear exhaust pipe 27 with a conventional muffler and tailpipe assembly 28 mounted on the rear portion of the frame 12.

FIGS. 3 and 4 illustrate the construction of the novel exhaust manifold 22. This member includes a cast body 30 defining first and second longitudinally aligned plenums 31, 32. Each of the plenums has a smaller inlet port 34 and a larger inlet port 35 which are adapted to connect with corresponding exhaust ports in the engine cylinder head. Each smaller port 34 receives exhaust gases from one of the end cylinders of the engine, while each larger port 35 receives exhaust gases from two of the cylinders intermediate the end cylinders. Thus, plenum 31 is connected with the three cylinders at one end of the cylinder block, while plenum 32 is connected with the three cylinders at the other end of the cylinder block.

Plenum 31 connects via a transfer passage 37 with an enlarged discharge passage 38 located near the adjacent end of the other plenum 32 and terminating in a ball end exhaust pipe fitting 40. An enlarged carburetor heat plenum 42 connects with the transfer passage 37, the connection being controlled by a pivotally mounted heat valve 43 actuatable to regulate the flow of exhaust heat against a vaporizing plate 44, separating the engine intake and exhaust systems.

Exhaust plenum 32 connects directly with a smaller discharge passage 46 that terminates in a tubular pipe fitting 48 disposed within the enlarged discharge passage 38 and arranged so that the two discharge passages 38, 46 and their associated fittings 40, 48 are coaxial.

FIGS. 5 and 6 show respectively transverse and longitudinal cross-sectional views through the exhaust manifold 22 and the associated exhaust pipe assembly 24 at the location of the discharge fittings. The pipe assembly includes an outer pipe 50, having a flanged end 51 held in sealing engagement with the spherical end of the fitting 40 by a loose flange 52, secured to a retaining flange 54 that forms part of the fitting 40. The assembly further includes a smaller inner pipe 56 that preferably has a slight spherical enlargement 57 at its outer end. This enlargement is adapted to be telescopically within a cylindrical bore 58 formed in the end of the tubular fitting 48. The pipe preferably fits snugly within the bore, but need not necessarily form a gas-tight fitting, since leakage through the joint only serves to connect the two exhaust discharge passages 38 and 46.

Preferably, as shown in FIG. 7, the inner and outer exhaust pipes are secured together, as by welding, at 60 near the end of the exhaust pipe assembly opposite that which is connected to the exhaust manifold. The pipes 50, 56 are not coaxial at this point and need not be coaxial at any point, except where they join with the coaxial discharge fittings as shown in FIGS. 5 and 6. The points intermediate the ends the pipes may or may not be coaxial; however, the sizing of the pipes is preferably such that the area contained within the inner exhaust pipe is essentially the same as the area contained between the inner and outer exhaust pipes, so that the flow areas of the inner and outer exhaust passages are essentially the same.

At the outlet end of the pipe assembly, the outer pipe 50 is sealingly secured, as by a ball flange and clamp arrangement 62, to the inlet end 64 of the catalytic exhaust converter 25 so that the exhaust gases from both the inner and outer pipe are joined at this point and discharged into the converter. The remainder of the exhaust system is of conventional construction.

From the foregoing description, it may be seen that the novel exhaust manifold and dual exhaust pipe arrangement provide a dual exhaust system for a multi-cylinder engine, wherein the exhaust gas flow from two groups, each including half the cylinders, is divided for an extended distance which may be to the point of connection of the exhaust system with a catalytic converter. Nevertheless, the arrangement takes up little, if any, more space than a single exhaust pipe arrangement and may be assembled as a single unit, with little more difficulty than if the assembly were a single exhaust pipe.

While the invention has been described by reference to a preferred embodiment, it should be understood that numerous changes could be made within the scope of the inventive concepts disclosed, and accordingly it is intended that the invention not be limited by the specific features of the embodiment disclosed, but that it should have the full scope permitted by the language of the following claims.

What is claimed is:

1. An exhaust manifold for a multi-cylinder internal combustion engine, said manifold defining two separate exhaust gas chambers, means for connecting said chambers to diverse ones of the engine cylinders to receive exhaust gas therefrom, an enlarged discharge passage extending from one of said chambers and terminating at a pipe fitting adapted to sealingly receive a first tubular exhaust pipe to carry exhaust gas from said one chamber, and a smaller discharge passage extending from the other of said chambers and terminating at a pipe fitting disposed within the enlarged discharge passage and adapted to receive a second tubular exhaust pipe disposed within the first pipe to carry exhaust gas from said other chamber.

2. An exhaust manifold as defined in claim 1 wherein the pipe fittings terminating the two discharge passages are coaxial.

3. An exhaust manifold as defined in claim 1 wherein the pipe fitting terminating the smaller discharge passage comprises an internal annular recess adapted to slidingly receive the end of such second tubular exhaust pipe and the pipe fitting terminating the enlarged discharge passage comprises an external flange seat adapted to receive an outwardly flared flange of such first tubular exhaust pipe.

4. An exhaust system for a multi-cylinder internal combustion engine, said system comprising
 a dual exhaust manifold defining two separate exhaust gas chambers, means for connecting said chambers to diverse ones of the engine cylinders to receive exhaust gases therefrom, an enlarged discharge passage extending from one of said chambers and terminating at a pipe fitting, and a smaller discharge passage extending from the other of said chambers and terminating at a pipe fitting disposed within the enlarged discharge passage and
 a pair of tubular exhaust pipes one connected with each of said pipe fittings and defining separate passages for the discharge of exhaust gases from the two manifold chambers, the pipe connected with the fitting of said smaller discharge passage being contained within the other pipe for a substantial portion of its length to provide separated flow of the discharged gases for a predetermined distance from the engine cylinders.

5. The exhaust system of claim 4 wherein the discharge passage pipe fittings of the exhaust manifold and their associated exhaust pipe connections are coaxial, the passages and their associated exhaust pipes being sized such that the flow area between the two pipes is approximately equal to the flow area within the inner pipe.

6. The combination of claim 4 wherein said exhaust pipes are secured together to form an assembly, the inner pipe being slidably received and telescopingly moveable within its associated manifold pipe fitting and the outer pipe having an outwardly flared flange which sealingly engages its associated manifold pipe fitting.

* * * * *